United States Patent Office 3,367,883
Patented Feb. 6, 1968

3,367,883
PROCESSES AND PRODUCTS FOR
CONDITIONING CAKING SALTS
Norman Earl Stahlheber, Columbia, Ill., assignor to
Monsanto Company, St. Louis, Mo., a corporation
of Delaware
No Drawing. Original application Oct. 17, 1961, Ser. No.
147,127, now Patent No. 3,273,960, dated Sept. 20,
1966. Divided and this application Oct. 21, 1965, Ser.
No. 500,164
5 Claims. (Cl. 252—385)

This invention relates to new and unexpectedly advantageous mixtures of alkaline earth metal phosphate salts, to processes for preparing them, and to methods for their u.e.

This is a division of my co-pending application Serial No. 147,127 filed October 17, 1961, now U.S. Patent 3,273,960 issued September 20, 1966.

The tendency for particulated salts such as monocalcium orthophosphate monohydrate (MCP), sodium chloride, sodium tripolyphosphate, etc. to cake, or to form large, hard lumps when they are exposed to a highly humid atmosphere and/or to high pressures for an extended period of time is well known. In the past, many efforts have been made to find a suitable method for the prevention or inhibition of this tendency to cake without complete success, particularly with respect to phosphate salts such as MCP which have a very strong caking tendency.

It is an object of this invention to provide materials for significantly reducing the normal tendency of particulated phosphate salts such as MCP to cake when a small amount of the material is blended with the salt which has the tendency to cake.

It is another object of this invention to provide improved methods for reducing the normal tendency of particulated salts, such as those described above, to cake when they are exposed to conditions of high humidity and/or pressure.

It is still another object of this invention to provide methods for the preparation of materials having the ability to significantly reduce the normal tendency of particulated salts such as those described above to cake.

These objects, as well as others, can be attained in accordance with the present invention by preparing and properly utilizing mixtures of orthophosphate and polyphosphate salts that result from the reaction of inorganic alkaline earth metal bases with superphosphoric acids that contain a fairly large proportion of polyphosphoric acids.

It has been found that when certain superphosphoric acids are reacted with a sufficient quantity of a reactive alkaline earth metal base, the resulting water-insoluble mixture of alkaline earth metal phosphate salts is unexpectedly proficient as an anti-caking agent. In fact, for some systems, such as for monocalcium orthophosphate monohydrate, for example in which conventional anti-caking agents such as commercial tricalcium phosphate (hydroxylapatite), sodium silico aluminate, etc., do not perform efficiently, it has been found that the products from the aforesaid reaction are particularly efficacious in this respect.

In order to simplify the detailed discussion of the present invention, the unexpectedly useful products from the reaction of these certain superphosphoric acids and alkaline earth metal bases will be termed "hyperphosphate" salts or "hyperphosphates" throughout the remainder of the present specification and the appended claims. Although it is not known with certainty why the alkaline earth metal hyperphosphates are so outstandingly effective as anticaking agents, it is believed that they function in this improved manner because their polyphosphate moiety is apparently predominantly amorphous (noncrystalline) in character. It is believed that this amorphous moiety of the alkaline earth metal hyperphosphates makes it possible for the products of the present invention to perform so much better as anticaking agents than would any otherwise similar blends of crystalline alkaline earth metal phosphate salts. Thus the alkaline earth metal hyperphosphates of this invention can be characterized in one respect by the fact that their polyphosphate moiety is at least about 65 weight percent and preferably is substantially entirely amorphous.

The superphosphoric acids useful in the practice of the present invention are those which contain, in addition to orthophosphoric acid, at least about 10, and preferably at least about 30, weight percent of polyphosphoric acids. (The polyphosphoric acids are those phosphoric acids that contain more than one phosphorous atom in each molecule or phosphorous "chain." Depending upon the actual concentration of phosphorous in the superphosphoric acids, polyphosphoric acids contained therein have from 2 to 12, or even more, phosphorous atoms per molecule. The more concentrated (in $P_2O_5$) superphosphoric acids contain relatively more of the higher polymers). Stated otherwise, the superphosphoric acids with which this invention is concerned are those that contain at least about 71 weight percent, and preferably at least about 75 weight percent of phosphorous, calculated as $P_2O_5$. Because they are somewhat easier to handle in the liquid state, it is also preferred that the superphosphoric acids that are utilized in the practice of the present invention be liquid, or at least semifluid at some temperature below about 75° C. Consequently, preferred superphosphoric acids are those that contain less than about 85 weight percent of phosphorous, calculated as $P_2O_5$.

Ordinarily, superphosphoric acids are manufactured by simply absorbing a certain amount of phosphorous pentoxide (in the form of $P_2O_5$ vapor which usually results from burning elemental phosphorous) into water, or into a relatively dilute solution of orthophosphoric acid, until the desired amount of phosphorous is contained in the aqueous, syrupy absorption medium. For purposes of the present invention it has been discovered that satisfactory superphosphoric acids can also be made by dissolving some alkali metal salts of the polyphosphoric acids (such as, for example, tetrasodium pyrophosphate, tetrapotassium pyrophosphate, sodium acid pyrophosphate, lithium acid pyrophosphate, sodium tripolyphosphate, potassium tripolyphosphate, sodium trimetaphosphate, potassium trimetaphosphate, sodium and/or potassium "glassy" phosphates, etc.) into orthophosphoric acid, or even into one of the superphosphoric acids. In this manner, the polyphosphoric acid fraction of the particular phosphoric acid which is being utilized can be changed to some extent without having to dilute the superphosphoric acid with water, or having to handle highly dangerous $P_2O_5$. Because the polyphosphate salts are soluble in orthophosphoric acid and in superphosphoric acid to only a limited degree, the amount of alkali metal polyphosphate salts that can be utilized in preparing the particular superphosphoric acid that is to be neutralized with the alkaline earth metal base according to the present invention, will be limited to that amount which can be dissolved into the superphosphoric acid. Ordinarily, when such alkali metal polyphosphate salts as those described above are employed so solubilized components in the superphosphoric acids of the invention, they will be present in the superphosphoric acids only to the extent that the ratio of the total cation (hydrogen plus alkali metal) moiety of the acid composition to phosphorous, calculated as $$\frac{H_2O + M_2O}{P_2O_5}$$

is between about 3.1 and about 1.2, but it is preferred that this ratio be between about 2.6 and about 1.7. M, in the foregoing formula is an alkali metal cation.

The alkaline earth metal bases which can be reacted with the above-described superphosphoric acids in the practice of this invention are those which have measurably higher solubilities in water than do their corresponding alkaline earth metal phosphate salts. Since almost all of the alkaline earth metal orthophosphate and alkaline earth metal polyphosphate salts (particularly those containing calcium and magnesium) are extremely insoluble in water, a fairly wide variety of alkaline earth metal bases can be utilized in the practice of this aspect of the invention. For example, calcium, magnesium, strontium, and barium carbonate, hydroxide, oxide, and the like, as well as mixtures of these, can be utilized in the practice of this invention. Because of problems relating to toxicity that sometimes arise when barium and strontium salts are utilized for certain purposes, and since barium and strontium bases are not readily available, the alkaline earth metal bases which are preferred are the calcium and magnesium bases. Of these, still further preferred are the hydroxides.

The above-described superphosphoric acids and alkaline earth metal bases can be brought into contact with one another in any particular manipulative manner desired without having a substantial effect upon the benefits which result from practicing the invention, or varying from the spirit of the invention. All that is necessary, for example, is that sufficient alkaline earth metal base be supplied to neutralize essentially all of the superphosphoric acids contained therein. It is preferred, however, that the superphosphoric acid be intermixed with the particular alkaline earth metal base employed only in the presence of sufficient water to provide both an efficient transfer of heat through the system and adequate ease of agitation. (This particular aspect of the invention will be described in more detail below.) Thus, the desired reaction of alkaline earth metal base with superphosphoric acid must ordinarily be made to occur in a fairly fluid, aqueous medium.

Perhaps the best way in which superphosphoric acid, water, and alkaline earth metal base can be brought together under the desired conditions is by first diluting the superphosphoric acid with water (preferably concurrently removing heat from the resulting dilute solution by any appropriate conventional means in order to minimize hydrolysis of the polyphosphoric acids), and then mixing the resulting relatively dilute aqueous solution of superphosphoric acid (containing polyphosphoric acids) into a slurry of the appropriate alkaline earth metal base. In this particular procedure the base can be dispersed in water prior to the mixing step, or can be added directly to the dilute aqueous superphosphoric acid solution. Also, via a preferred procedure, fairly concentrated superphosphoric acid can be added slowly (drop-wise or in a slow stream, for example) to an agitated solution or suspension of the appropriate alkaline earth metal base in water. In this manner, the hydrolysis rate of the polyphosphoric acids can be minimized, since it has been found that their hydrolysis occurs more slowly in basic solutions. The heat of dilution (of the superphosphoric acid) as well as the heat evolved from the desired reaction can be removed as the reaction proceeds. Thus, the superphosphoric acid can be maintained at a relatively low temperature until it has been completely reacted with the particular alkaline earth metal base employed.

It should be noted that when superphosphoric acids containing a significant quantity of any of the polyphosphoric acids described above are diluted with water, the relative proportions of orthophosphoric acid to the various polyphosphoric acids (as well as the relative proportions of the various polyphosphoric acids, one to another) in the diluted aqueous system remain substantially unchanged from those which existed in the original superphosphoric acid unless or until the polyphosphoric acids are degraded by hydrolysis. Thus, an alkaline earth hyperphosphate prepared by reacting a particular alkaline earth metal base with a diluted superphosphoric acid (that has not been hydrolytically degraded) is substantially identical to the hyperphosphate which results from reacting the alkaline earth metal base with the superphosphoric acid in a concentrated, undiluted state (assuming that reaction conditions were such that the concentrated superphosphoric acid was not degraded). Hence, the present invention can be said to involve the reaction of one of the alkaline earth metal bases described above with a mixture of orthophosphoric acid and polyphosphoric acids, which mixture is similar to that contained in any of the desirable superphosphoric acids described above.

Ordinarily the reaction or neutralization of superphosphoric acid with alkaline earth metal base should be permitted to proceed until substantially no unreacted superphosphoric acid remains in the aqueous reaction medium. Because the presence of a significant amount of unreacted phosphoric acids in the final alkaline earth metal hyperphosphate products is not desirable, the pH (measured at the 1 weight percent level in distilled water) of the aqueous reaction medium should be between about 5 and about 9, and preferably between about 6 and about 8 when the reaction has proceeded to the optimum extent. On the other hand, up to about 10 weight percent of alkaline earth metal base can be present in the final hyperphosphate products without detracting substantially from the benefits that can be derived from practicing the present invention.

The reaction of superphosphoric acid and one or more of the above-described alkaline earth metal bases can be conducted in an aqueous medium in conventional mixing equipment, preferably while the materials are being continuously stirred. The temperature of the aqueous medium during the above-described reaction or neutralization should generally be maintained between about 2° C. and about 50° C., but should preferably be between about 10° C. and about 35° C., although even higher temperatures can be utilized. Where higher temperatures are employed, careful consideration must be given to the effect of the increase in the rate of hydrolysis of the polymeric fraction of superphosphoric acid, which rate of hydrolysis increases considerably when the reaction temperature is raised.

Since the reaction rate (of superphosphoric acid with an alkaline earth metal base) is interdependent to some extent upon not only the temperature of the reaction medium, but also the particular base employed (For example, calcium carbonate ordinarily reacts more slowly with superphosphoric acid than does calcium hydroxides), a concise definition of all of the elements relating to the preferred conditions under which the invention should be carried out cannot be made. It should be noted, however, that the reaction conditions must be such that the alkaline earth metal hyperphosphate salts always contain at least about 10 weight percent, and preferably at least about 30 weight percent of polyphosphate salts.

In order to provide practically efficient ease by which heat can be transferred through the reaction medium (wherein superphosphoric acid is reacted with an alkaline earth metal base, as described above) and also in order to provide adequate ease of agitation (so that conventional mixing equipment can be utilized for the processes of this invention), it has been found that it is best to use at least about 70 weight percent of water (based on the combined weight of water plus final alkaline earth metal hyperphosphate product), and sometimes as much as 90 weight percent of water, or even more. As a practical matter, however, because of the expense of removing the water from the hyperphosphate product (which removal must be undertaken subsequently), usually not more than about 85 weight percent of water will be utilized in these processes.

The water can be removed from the above-described final slurry or paste by any particular procedure desired. For example, conventional drum-driers or spray-drying facilities can readily be utilized. The dried product resulting from the application of conventional drying techniques to the slurries or pastes which in turn resulted from the above-described reaction is generally in the form of loosely agglomerated flakes or granules, which are usually larger than desired for the product's optimum performance as an anticaking agent. When such lumping or agglomeration occurs, usually a single pass of the dried product through a conventional powder mill, such as for example a hammer mill, is sufficient to reduce the relatively larger particles to a more desirable size. It has been found that, although hyperphosphate products having particles that barely pass through a U.S. Standard 30 mesh screen are effective to some extent as anticaking agents, for highest efficiency as an anticaking agent, most of the particles of hyperphosphate product, produced according to this invention, should be finely divided; that is, the particles should be small enough so that at least about 80 weight percent of them can be passed through a U.S. Standard 100 mesh screen. Preferably, the particles should be small enough so that at least about 70 weight percent of them can be passed through a U.S. Standard 325 mesh screen.

When the finely divided alkaline earth metal hyperphosphate salts are to be utilized as anticaking agents, they need only be interspersed reasonably well through the particulated material which is to be prevented from caking excessively. Sufficiently good dispersion of the above-described hyperphosphate salts can be accomplished, for example, in practically any conventional mixer or blender. Thus, the particulated material (which will ordinarily have a tendency to cake under certain conditions) and the finely divided alkaline earth metal hyperphosphate need only be intermixed in the appropriate proportions in a conventional ribbon type mixer, for example for about 5 minutes, in order to achieve an excellent degree of dispersion of the anticaking additive through said particulated material.

While, in order to reduce the caking tendencies of materials such as MCP, sodium chloride, sugar, sodium tripolyphosphate, etc., very small amounts of finely divided alkaline earth metal hyperphosphates are effective, (for example, some observable anticaking effectiveness can be observed when they are present at a level as low as about 0.2 weight percent), usually at least about 0.5 weight percent (based on the weight of the material being treated) of one or more of the hyperphosphates of this invention is ordinarily utilized. For optimum results, usually at least about 1 weight percent of one of these hyperphosphates should be interspersed through the particulated material being treated. There is no critical upper limitation as to the amount of alkaline earth metal hyperphosphate that can be utilized in order to reduce the caking tendency of any given material. However, as practical matter, usually not more than about 10 weight percent should be used.

As it was stated above, the apparent reason that the alkaline earth metal hyperphosphates which are produced according to this invention perform so efficiently as anticaking agents is that the polyphosphate fraction of these materials is amorphous in character. X-ray analysis of calcum hyperphosphate, for example, gave patterns which indicated that the only crystalline material present was tricalcium orthophosphate. Thus, since the calcium polyphosphates gave no X-ray diffraction pattern, it is concluded that they are amorphous or non-crystalline in form. Another factor that tends to support the conclusion that the hyperphosphates of this invention are unique is their excellent performance as anticaking agents for, for example, MCP, as compared to the performance in the same application of a physical blend of (crystalline) phosphate salts, which blend is made up to simulate as closely as possible the hyperphosphate. For example, calcium hyperphosphate made from 105% $H_3PO_4$ (76% $P_2O_5$) according to Example I, below, is a significantly superior anticaking agent for particulated (powdered) MCP as compared with a physical blend of 42 weight percent of crystalline tricalcium orthophosphate, 42 weight percent of crystalline calcium pyrophosphate, 8.5 weight percent of crystalline calcium tripolyphosphate, and 0.5 weight percent of crystalline calcium tetraphosphate, even though the particle size distribution of this physical blend of crystalline salts is almost identical to that of the calcium hyperphosphate. Relative performance data for these materials are given in Table I, below.

In the following examples, all parts are by weight unless otherwise specified.

EXAMPLE I

*Preparation of calcium hyperphosphate*

Into 2330 parts of water in a conventional glass-lined, jacketed mixing tank are blended one hundred parts of superphosphoric acid containing 75.5 weight percent of phosphorous, calculated as $P_2O_5$. The acid is added slowly in order to avoid localized overheating and the unnecessary hydrolysis of the polymeric phosphoric acids that might otherwise result from a quick dilution of the superphosphoric acid. The temperature of the water during the addition of the superphosphoric acid is maintained below about 35° C. by circulating cool water through the jacket of the mixing tank. Into another, similar mixing tank are poured 5460 parts of water. To this water are added 1132 parts of calcium hydroxide. The resulting slurry is agitated while the diluted superphosphoric acid, prepared above, is added slowly to the slurry. The temperature of the aqueous reaction mixture is maintained below about 35° C. during and subsequent to the addition of the superphosphoric acid. The formation of calcium hyperphosphate is completed within a period of about thirty minutes after the superphosphoric acid is introduced into the calcium hydroxide slurry. The pH of the resulting slurry is then adjusted to about 7 by the incremental addition of small amounts of lime and superphosphoric acid. Other acids and/or bases can be used for this final adjustment of the pH of the slurry to the desired value.

The resulting slurry is then dried on a 36 inch diameter stainless steel drum dryer which is heated with steam under 80 pounds per square inch gauge pressure and rotating at 6 revolutions per minute. The drum-dried product contains about 5 weight percent of moisture and is in the form of fairly large flakes and agglomerates. This product is then passed once through a conventional hammer mill. Its particles are thereby reduced in size so that about 95 weight percent of them can be passed through a U.S. Standard 325 mesh screen. X-ray diffraction analysis of this product reveals that tricalcium orthophosphate is the only crystalline material present.

EXAMPLE II

*Preparation of magnesium hyperphosphate*

The procedure shown in Example I is followed except that 810 parts of magnesium hydroxide is used in place of the calcium hydroxide. The calcium and magnesium hyperphosphates from Examples I and II, respectively are both excellent anticaking agents for MCP, sodium chloride, sodium tripolyphosphate, as well as many other materials that have a tendency to cake when they are exposed to conditions of high humidity and/or pressure.

Anticaking properties of the alkaline earth metal hyperphospates

Ten thousand parts of powdered commercial monocalcium orthophosphate monohydrate (MCP) are blended in a conventional ribbon-type mixer for about 15 minutes with 150 parts of the finely-divided calcium hyperphosphate prepared according to Example I, above. Thirty grams of the resulting blend are then placed loosely in a 3-cm. by 3½-cm. rigid-walled "exposure" cylinder, which is then covered (top and bottom( with a moisture permeable fabric and exposed for 48 hours at 90° F., under 6.7 p.s.i.g. pressure to an atmosphere at 80% relative humidity. The results of this test (to determine the resistance of the treated MCP to caking) are listed in Table I, below, along with comparative data for both conventionally known anticaking agents, and for other alkaline earth salts of superphosphoric acid (hyperphosphates). Note that results in Table I are given in terms of "caking numbers" which represent the pounds of force required to be applied uniformly to the top surface of the "cake" of MCP in order to break it. The lower caking numbers indicate better resistance to the normal caking tendency of MCP. Caking numbers lower than about 20 are considered desirable. Generally, it has been found that those products which yield caking numbers lower than about 20 will not cake appreciably under ordinary conditions of handling and shipping.

TABLE I
[Caking numbers for various anticaking agents]

| Agent | Concentration [a] | |
|---|---|---|
| | 1% | 2% |
| (a) Control-powdered monocalcium orthophosphate monohydrate | 45 | 45 |
| (b) Calcium hyperphosphate, Example I (from 105% $H_3PO_4$)[b] | 10 | 5 |
| (c) Calcium hyperphosphate (from 110% $H_3PO_4$)[b] | 8 | (c) |
| (d) Magnesium hyperphosphate, Example II (from 105% $H_3PO_4$)[b] | 12 | 9 |
| (e) Simulated calcium hyperphosphate [b, d] | | 30 |
| (f) Commercial powdered tricalcium orthophosphate [b] | | 36 |
| (g) Microcrystalline tricalcium orthophosphate [e] | | 32 |
| (h) Sodium silico aluminate [b] (commercial "flow-conditioner") | 21 | [f] 11 |

[a] In powdered monocalcium orthophosphate monohydrate.
[b] Average particle size = <10µ.
[c] Cake broke before weight applied.
[d] Blended salts, combined to the relative proportions present in agent (b), above.
[e] Average particle size = <1µ.
[f] Dusty.

Note that the caking number test is a very severe one, and that the alkaline earth metal hyperphosphates of the present invention are unexpectedly superior as anticaking agents for MCP, compared to products that are presently commercially recommended for this purpose. Also of interest is the fact that, although the largest single chemical component of the calcium hyperphosphate from 105% $H_3PO_4$ (b in Table I), is tricalcium orthophosphate, the hyperphosphate performs significantly better in this test than does a product that consists essentially of tricalcium orthophosphate (f in Table I).

What is claimed is:

1. A process for manufacturing an alkaline earth metal phosphate composition useful as an anticaking agent, which process comprises reacting together, at a temperature between about 2° C. and 50° C. and in a liquid aqueous medium until a pH between about 5 and about 9 in said aqueous medium is obtained; said pH being measured at the 1 weight percent level of the aqueous reaction medium in distilled water, an inorganic alkaline earth metal base having a higher water solubility than its corresponding alkaline earth metal orthophosphate and polyphosphate salts and a superphosphoric acid containing both orthophosphoric acid and polyphosphoric acids having more than one phosphorus atom in their molecules and containing from at least about 71 weight percent to about 85 weight percent of $P_2O_5$, said polyphosphoric acids being at least about 10 weight percent of the combined weight of said orthophosphoric acid and said polyphosphoric acids in said aqueous medium, and recovering said alkaline earth metal phosphate composition; said alkaline earth metal phosphate composition containing at least about 10 weight percent of alkaline earth metal polyphosphate salts at least 65 weight percent of which are in the amorphous state.

2. A process for manufacturing an alkaline earth metal phosphate composition, which process comprises the steps of first reacting together, in an acidic aqueous medium and at a temperature between about 2 and about 50° C., superphosphoric acid containing from at least about 71 to about 85 weight percent of $P_2O_5$, and at least a stoichiometric amount, based on said superphosphoric acid, of an inorganic alkaline earth metal base having a higher water solubility than its corresponding alkaline earth metal orthophosphate and polyphosphate salts and thereafter drying the resulting aqueous slurry whereby said alkaline earth metal phosphate composition, containing at least about 10 weight percent of alkaline earth metal polyphosphate salts at least 65 weight percent of which are in the amorphous state, is produced; the pH of the aqueous reaction medium being between about 5 and about 9 at the time it is dried.

3. A process for manufacturing calcium phosphate composition, which process comprises intermixing, at a temperature within the range of from about 10° C. to about 35° C., water, an acid-neutralizing material selected from the group consisting of calcium hydroxide, calcium oxide, calcium carbonate, and mixtures thereof, and an amount of a superphosphoric acid which contains at least about 75 to about 85 weight percent of $P_2O_5$, said amount of superphosphoric acid being, at most, about the stoichiometric amount required to neutralize said acid-neutralizing material, and said water being present in the resulting mixture to the extent of at least about 70 to about 90 weight percent of the combined weight of said water, said acid-neutralizing material, and said superphosphoric acid; maintaining the temperature of said water below about 35° C. and above about 10° C. until substantially all of said superphosphoric acid has reacted with said acid-neutralizing material and the pH of the reaction medium is between about 6 and about 8, and thereafter removing said water from the resulting calcium phosphate reaction product; said reaction product containing at least about 30 weight percent of calcium polyphosphate salts at least 65 weight percent of which are in the amorphous state.

4. A process for manufacturing calcium phosphate composition which process comprises first forming a slurry by intermixing water and calcium hydroxide, thereafter reacting said calcium hydroxide with an amount of superphosphoric acid that contains from about 75 to about 85 weight percent of $P_2O_5$, said amount of superphosphoric acid being about the stoichiometric amount required to neutralize said calcium hydroxide and the amount of said water being between about 70 and about 90 weight percent of the combined weights of said water, said superphosphoric acid, and said calcium hydroxide, said superphosphoric acid being added slowly to said slurry while the temperature of said slurry is maintained below about 35° C. and above about 10° C., maintaining the temperature of the resulting mixture below about 35° C. and above about 10° C. until the pH of said resulting mixture is between about 6 and 8, and subsequently removing said water from the resulting calcium phosphate reaction product.

5. A particulate alkaline earth metal phosphate product produced by reacting inorganic alkaline earth metal base with superphosphoric acid containing from about 71% to about 85% $P_2O_5$, said alkaline earth metal base being one which has a higher water solubility than its corresponding alkaline earth orthophosphate and alkaline earth polyphosphate salts, and said reaction being conducted in a liquid aqueous medium at a temperature between about 2° C. and about 50° C. until said aqueous medium has a pH of between about 5 and 9; and thereafter recovering said alkaline earth metal phosphate product from said aqueous medium.

References Cited

Chemical Abstracts, American Chemical Society, vol. 55, 1961, p. 17327i.

Friend, Textbook of Inorganic Chemistry, Charles Griffin and Co., 1925, vol. 3, part I, p. 95.

The Condensed Chemical Dictionary, Reinhold, 1961, pp. 887–888.

LEON D. ROSDOL, *Primary Examiner.*

I. GLUCK, *Assistant Examiner.*